US011023174B2

(12) United States Patent
Goodman et al.

(10) Patent No.: US 11,023,174 B2
(45) Date of Patent: Jun. 1, 2021

(54) COMBINING OF MOVE COMMANDS TO IMPROVE THE PERFORMANCE OF AN AUTOMATED DATA STORAGE LIBRARY

(71) Applicant: International Business Machines Corporation, Armonk, NY (US)

(72) Inventors: Brian Goodman, Tucson, AZ (US); Lee Jesionowski, Tucson, AZ (US); Kenny Nian Gan Qiu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 16/568,665

(22) Filed: Sep. 12, 2019

(65) Prior Publication Data

US 2021/0081139 A1 Mar. 18, 2021

(51) Int. Cl.
*G06F 12/00* (2006.01)
*G06F 3/06* (2006.01)

(52) U.S. Cl.
CPC .......... *G06F 3/0659* (2013.01); *G06F 3/0607* (2013.01); *G06F 3/0686* (2013.01)

(58) Field of Classification Search
CPC ..... G06F 3/0659; G06F 3/0607; G06F 3/0686
See application file for complete search history.

(56) References Cited

U.S. PATENT DOCUMENTS 6,496,791 B1   12/2002  Yates et al.
6,842,841 B1   1/2005   Kuik et al.
7,076,327 B1 * 7/2006   Desai ................... G06F 3/0613
                                                                    700/213
7,308,529 B1 * 12/2007  Desai ................... G11B 15/689
                                                                    711/111
8,561,076 B1 * 10/2013  Desai ................... G06F 3/0611
                                                                    718/104

(Continued)

OTHER PUBLICATIONS

Britton et al., "Dual Gripper Commands for an Automated Tape Library", IP.com Prior Art Database Technical Disclosure, IP.com No. IPCOM000121906D, Apr. 4, 2005, pp. 168-170.

*Primary Examiner* — Prasith Thammavong
(74) *Attorney, Agent, or Firm* — Scully, Scott, Murphy & Presser, P.C.

(57) ABSTRACT

A system and method of combining move commands of an automated data storage library is disclosed that includes receiving a first command from a host system to remove a first data storage cartridge from a data storage drive of the automated data storage library; maintaining the first data storage cartridge within the data storage drive until receiving a second command from the host system to move a second data storage cartridge into the data storage drive; responding to the host system with a successful move completion status of the first data storage cartridge from the data storage drive, even though the first data storage cartridge is maintained within the data storage drive; and updating a cartridge inventory for the host system to indicate that the first data storage cartridge is located in a requested storage slot location after receiving the first command from the host system to remove the first data storage cartridge from the data storage drive, even though the first data storage cartridge is maintained within the data storage drive.

20 Claims, 11 Drawing Sheets

(56) References Cited

U.S. PATENT DOCUMENTS

| | | | |
|---|---|---|---|
| 8,762,330 B1* | 6/2014 | Kick | G06F 16/1774 |
| | | | 707/613 |
| 9,159,357 B2 | 10/2015 | Thompson et al. | |
| 9,483,213 B1 | 11/2016 | Wharton et al. | |
| 9,684,472 B2 | 6/2017 | Bish et al. | |
| 2004/0199810 A1* | 10/2004 | Tarcea | G06F 3/061 |
| | | | 714/6.3 |
| 2009/0109565 A1* | 4/2009 | Thompson | G11B 23/042 |
| | | | 360/69 |
| 2011/0282835 A1* | 11/2011 | Cannon | G06F 16/119 |
| | | | 707/622 |
| 2015/0050106 A1 | 2/2015 | Thompson et al. | |
| 2016/0103616 A1 | 4/2016 | Bish et al. | |

* cited by examiner

COMBINING OF MOVE COMMANDS TO IMPROVE THE PERFORMANCE OF AN AUTOMATED DATA STORAGE LIBRARY

BACKGROUND

The present disclosure relates to a library for the storage and transfer of data, and more specifically, to a method of combining move commands for the automated movement of data storage cartridges in order to improve performance of a data storage library.

Automated data storage libraries are known for providing cost effective storage and retrieval of large quantities of data. The data in automated data storage libraries is typically stored on the media contained in data storage cartridges that are, in turn, stored at storage slots or locations and the like inside the library in a fashion that renders the media, and its resident data, accessible for physical retrieval. Such data storage cartridges, are also commonly referred to as "removable media." The media in data storage cartridges also referred to as data storage cartridge media or data storage media may comprise any type of media on which data may be stored, and which optionally may serve as removable media, including but not limited to magnetic media (such as magnetic tape or disks), optical media (such as optical tape or disks), electronic media (such as PROM, EEPROM, flash PROM, COMPACTFLASH™, SMARTMEDIA™, MEMORY STICK™, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more robotic accessors. Such accessors have grippers for physically retrieving the selected data storage cartridges from the storage slots within the automated data storage library and transporting such cartridges to the data storage drives by moving, for example, in the horizontal (X) and vertical (Y) directions.

Efforts to improve the performance of data storage centers often aim to minimize the time, energy, and cost associated with processing and storing data. One option employed to improve performance of date storage libraries is to minimize the number of move operations executed by the one or more robot accessors. One such method utilizes an "exchange" command for automated data storage libraries which allows robot accessors having two or more grippers to support multiple move commands via a single command, thereby potentially eliminating a move operation of the robot accessor(s). However, some data storage libraries do not have more than one gripper, some data storage libraries do not support such an "exchange" command, and/or some host applications do not sufficiently support such an "exchange" command.

In another method, a data storage library may utilize one or more temporary repositories positioned near the tape drives, where the temporary repositories are configured to temporarily hold one or more data storage cartridges. Thus, as opposed to utilizing a robotic accessor to move the one or more data storage cartridges to/from a storage shelf system, the gripper of the robotic accessor may simply move the data storage cartridge(s) to/from a selected tape drive to/from a temporary repository. However, while utilizing one or more temporary repositories may reduce the overall distance and time needed by the robotic accessor(s) to move the data storage cartridge(s) within the data storage library, the total number of movement operations completed by the robotic accessor(s) is not necessarily reduced.

Accordingly, there is a need for data storage libraries, and particularly those having only one gripper, to have an improved method for minimizing the number of move operations executed by the one or more robot accessors.

SUMMARY

The summary of the disclosure is given to aid understanding of a data storage library, its operations and the storage, and movement of data storage media in automated data storage libraries. The present disclosure is directed to one of ordinary skill in the art. It should be understood that various aspects and features of the disclosure may advantageously be used separately in some instance, or in combination with other aspects and features of the disclosure in other instances. Accordingly, variations and modifications can be made to the data storage library, and its operations to achieve different effects.

In one or more embodiments a method of combining move commands of an automated data storage library is disclosed. In one or more aspects, the method includes: receiving a first command from a host system to remove a first data storage cartridge from a data storage drive of the automated data storage library; maintaining the first data storage cartridge within the data storage drive; responding to the host system with a successful move completion status of the first data storage cartridge from the data storage drive, even though the first data storage cartridge is maintained within the data storage drive; receiving a second command from the host system to move a second data storage cartridge to the data storage drive; removing the first data storage cartridge from the data storage drive; transporting the first data storage cartridge to a proximity of a storage slot of the automated data storage library holding the second data storage cartridge; removing the second data storage cartridge from the storage slot; inserting the first data storage cartridge into the storage slot previously holding the second data storage cartridge or a separate storage slot located near the storage slot previously holding the second data storage cartridge; transporting the second data storage cartridge to the data storage drive; and inserting the second data storage cartridge into the data storage drive.

The method in an aspect further comprises responding to the host system with an unoccupied data storage drive status after receiving a status request command from the host system, even though the first data storage cartridge is maintained within the data storage drive. The method in a further aspect can include updating a cartridge inventory for the host system to indicate that the first data storage cartridge is located in a requested storage slot location after receiving the first command from the host system to remove the first data storage cartridge from the data storage drive, even though the first data storage cartridge is maintained within the data storage drive. In one or more embodiments, the method further includes updating a cartridge inventory of the host system to indicate that the first data storage cartridge is located in one of the storage slot previously holding the second data storage cartridge or the separate storage slot located near the storage slot previously holding the second data storage cartridge after inserting the second data storage cartridge into the data storage drive. The steps of transporting the first data storage cartridge and the second data storage cartridge preferably are completed by a robotic accessor of the automated data storage library.

A method in one or more embodiments is disclosed that comprises: providing at least one data storage library having a plurality of storage slots and one or more data storage drives; providing a plurality of data storage cartridges within at least the plurality of storage slots; providing a robotic accessor having one or more gripper assemblies within the at least one data storage library; transporting, by the robotic accessor, a first data storage cartridge from a first storage slot to one of the one or more data storage drives; receiving a first command from a host system to remove the first data storage cartridge from the data storage drive; maintaining the first data storage cartridge within the data storage drive; responding to the host system with a successful move completion status of the first data storage cartridge from the data storage drive, even though the first data storage cartridge is maintained within the data storage drive; receiving a second command from the host system to move a second data storage cartridge to the data storage drive; removing, by the robotic accessor, the first data storage cartridge from the data storage drive; transporting, by the robotic accessor, the first data storage cartridge to a proximity of a second storage slot of the at least one data storage library holding the second data storage cartridge; removing, by the robotic accessor, the second data storage cartridge from the second storage slot; inserting, by the robotic accessor, the first data storage cartridge into the second storage slot or a separate storage slot located near the second storage slot; transporting, by the robotic accessor, the second data storage cartridge to the data storage drive; and inserting, by the robotic accessor, the second data storage cartridge into the data storage drive.

According to one or more embodiments a method of combining move commands of an automated data storage library is disclosed, the method comprising: receiving a first command from a host system to remove a first data storage cartridge from a data storage drive of the automated data storage library; maintaining the first data storage cartridge within the data storage drive until receiving a second command from the host system to move a second data storage cartridge into the data storage drive; responding to the host system with a successful move completion status of the first data storage cartridge from the data storage drive, even though the first data storage cartridge is maintained within the data storage drive; and updating a cartridge inventory for the host system to indicate that the first data storage cartridge is located in a requested storage slot location after receiving the first command from the host system to remove the first data storage cartridge from the data storage drive, even though the first data storage cartridge is maintained within the data storage drive.

BRIEF DESCRIPTION OF THE DRAWINGS

The various aspects, features, and embodiments of the data storage system and method of combining move commands in a data storage system, including systems and methods of transporting data storage media will be better understood when read in conjunction with the figures provided. Embodiments are provided in the figures for purposes of illustrating and explaining aspects, features, and/or various embodiments of the data storage library and method of operation including the combining of move commands, but the claims should not be limited to the precise system, assembly, subassembly, arrangement, structures, features, aspects, embodiments, devices, methods, or processes shown and described, and the systems, assemblies, subassemblies, arrangements, structures, features, aspects, embodiments, devices, methods, or processes shown and described may be used singularly or in combination with other systems, assemblies, subassemblies, arrangements, structures, features, aspects, embodiments, devices, methods, or processes.

FIG. 7A shows the housing in phantom lines to show the interior of the deep slot cell.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Figure 1:
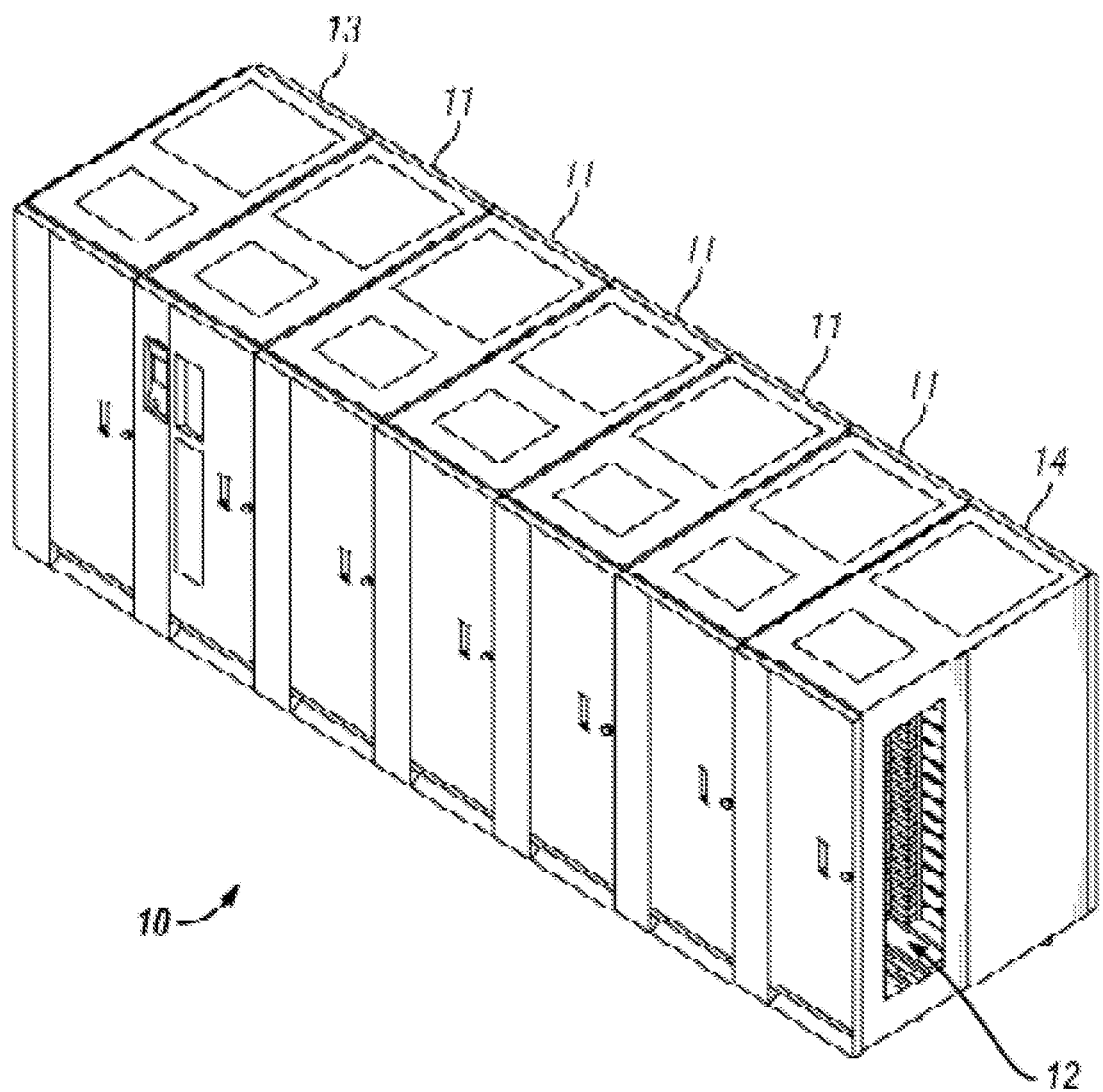
FIG. 1 is a perspective view of an embodiment of an automated data storage library in accordance with an aspect of the disclosure.
Figure 2:
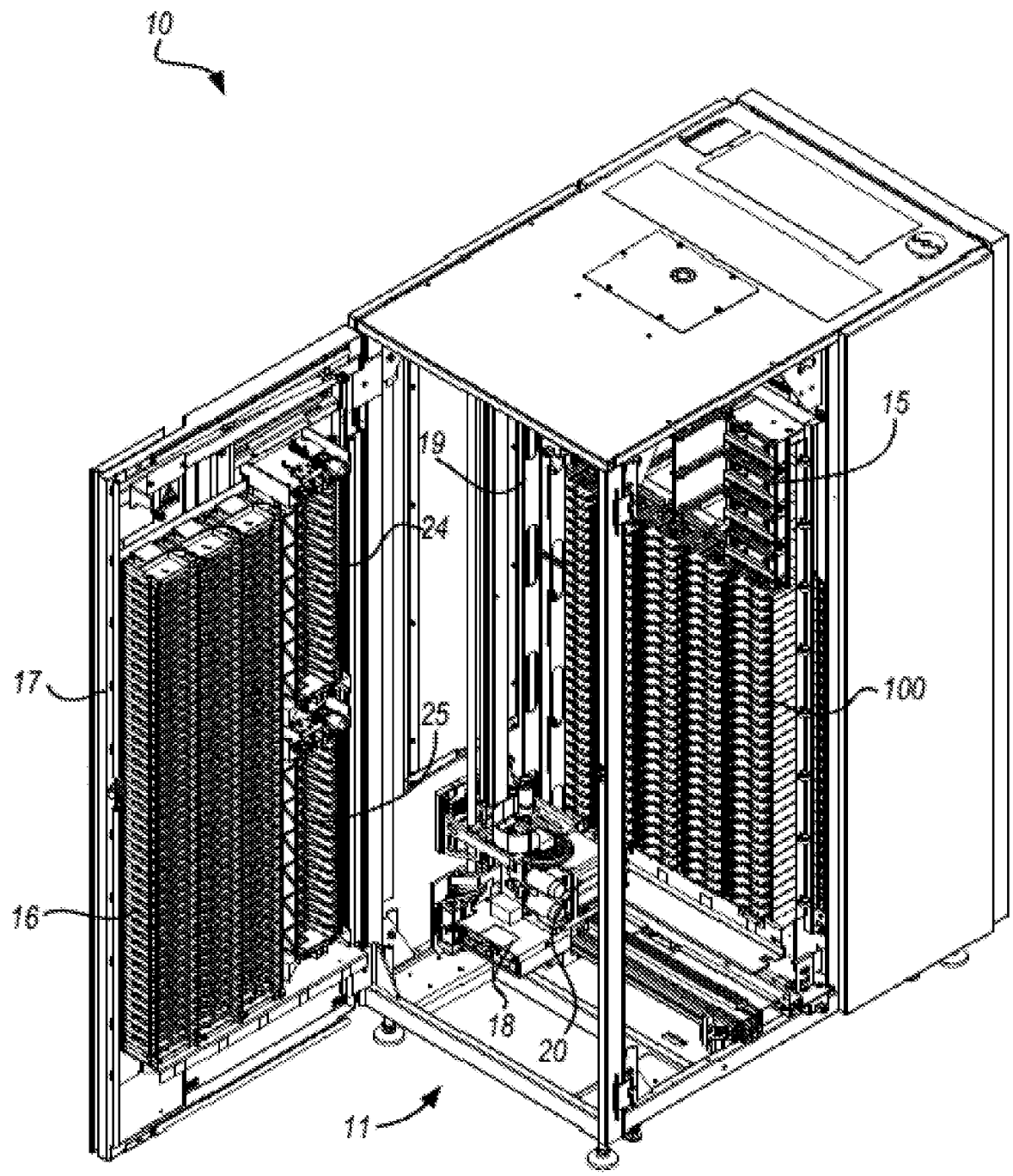
FIG. 2 is a perspective view of the interior of a storage frame from the data storage library of FIG. 1.

FIG. 1 and FIG. 2 illustrate an automated data storage library 10 which stores and retrieves data storage cartridges, containing data storage media (not shown), from multi-cartridge deep slot storage cells 100 and single cartridge storage slots 16. An example of an automated data storage library which has a similar configuration as that depicted in FIG. 1 and FIG. 2, and may be implemented with some of the various approaches herein is the IBM 3584 UltraScalable Tape Library.

The library 10 of FIG. 1 includes a left hand service bay 13, one or more storage frames 11, and right hand service bay 14. As will be discussed in further detail below, a storage frame may comprise an expansion component of the library. Thus, storage frames may be added or removed to expand or reduce the size and/or functionality of the library. According to different approaches, frames may include additional storage slots, deep storage slot cells, drives, import/export stations, accessors, operator panels, library controllers, communication cards, etc. Moreover, an accessor aisle 12 preferably extends between the storage frames and bays of the embodiments in FIG. 1, thereby allowing an accessor to move between frames.

FIG. 2 shows an exemplary embodiment of a storage frame 11, which may act as the base frame of the library 10 or may comprise the entire library. Herein, a library frame refers to a non-expandable library, an expandable library and/or an expansion component of a library. The library 10 illustrated in FIG. 2 may have only a single accessor 18 (i.e., there are no redundant accessors) and no service bay. However, in other embodiments, a library may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. In one aspect, the interior of the multi-cartridge deep slot cells may be arranged so that the plurality of data storage cartridges are in sequential order of tiers from front to rear (e.g., see FIG. 7A).

With continued reference to FIG. 2, the storage frame 11 of the library 10 may include at least one data storage drive 15, e.g., for reading and/or writing data with respect to the data storage media in the data storage cartridges. Additionally, a first accessor 18 may be used to transport data storage cartridges containing data storage media between the plurality of storage slots 16, the multi-cartridge deep slot cells 100, and/or the data storage drive(s) 15. According to various approaches, the data storage drives 15 may be optical disk drives, magnetic tape drives, or other types of data storage drives that are used to read and/or write data with respect to the data storage media. In one embodiment, one or more data storage cartridges may be added into and/or removed from the library, e.g., at an I/O station 24, 25.

As described above, the storage frames 11 may be configured with different components depending upon the intended function. One configuration of storage frame 11 may comprise storage slots 16 and/or multi-cartridge deep slot cells 100, data readers or drive(s) 15, and or accessors 18, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage cartridges, in addition to having a bar code scanner or other reading system, such as a cartridge memory reader or similar system mounted on the gripper assembly 20, to "read" identifying information about the data storage cartridge.

The service bays may be configured with different components and in different configurations depending upon its intended function. The service bay is typically another frame of the library 10 and, without limiting the disclosure, generally provides an area to house and perform service on the robotic accessor without interfering with the operation of the other library frames. The service bay may include a moveable panel, barrier or door to provide access to its interior and/or to protect someone servicing an accessor or other component associated with the service bay. The service bay may further include one or more data cartridge storage slots, multi-cartridge deep slot storage cells, data cartridges, accessors, data readers or drives, as well as other components.

Figure 3:
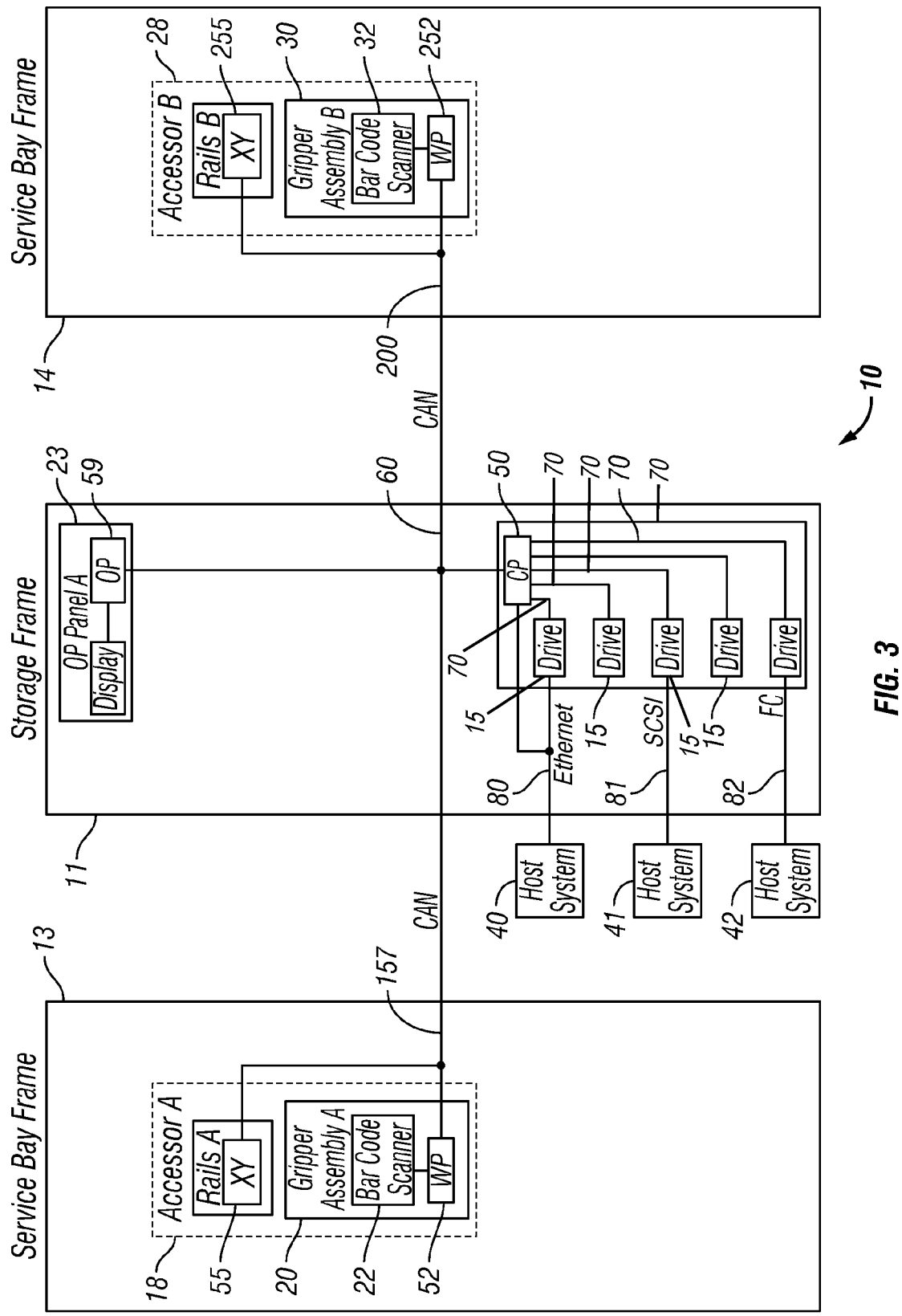
FIG. 3 is a block diagram of one embodiment of an automated data storage library in accordance with an aspect of the disclosure.

FIG. 3 depicts and schematically illustrates an automated data storage library 10, in accordance with one embodiment. As an option, the automated data storage library 10 may be implemented in conjunction with features from any other embodiment listed herein, such as those described with reference to the other figures. Of course, however, automated data storage library 10 and others presented herein may be used in various applications and/or in permutations which may or may not be specifically described in the illustrative embodiments listed herein. Further, the automated data storage library 10 presented herein may be used in any desired environment. Thus, FIG. 3 (and the other figures) should be deemed to include any and all possible permutations.

Referring now to FIG. 3, the automated data storage library 10 as described in reference to FIG. 1 and FIG. 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as providing a user interface that allows a user to interact with the library, responding to host requests for element status, inventory, library status, etc. The specific commands, the conversion of those commands to physical movements of the accessor, gripper, controllers, and other components, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a bar code scanner 22 (e.g., reading system) to "read" identifying information about the data storage cartridges depending on the desired embodiment. Furthermore, the right hand service bay 14 is shown having a second accessor 28, which includes a gripper assembly 30 and may also include a reading system 32 to "read" identifying information about the data storage cartridges.

According to one approach, in the event of a failure or other unavailability of the first accessor 18, or its gripper assembly 20, etc., the second accessor 28 may perform some or all of the functions of the first accessor 18. Thus, in different approaches, the two accessors 18, 28 may share one or more mechanical paths, they may have completely independent mechanical paths, or combinations thereof. In one example, the accessors 18, 28 may have a common horizontal rail with independent vertical rails to travel thereal ong. Moreover, it should be noted that the first and second accessors 18, 28 are described as first and second for descriptive purposes only and this description is not meant to limit either accessor to an association with either the left hand service bay 13 or the right hand service bay 14.

In an exemplary embodiment which is in no way intended to limit the disclosure or the invention, the first and second accessors 18, 28 may preferably move their respective grippers in at least two directions, called the horizontal "X" direction and vertical "Y" direction, e.g., to retrieve and grip, deliver and release, load and unload, etc. the data storage cartridges at the storage slots 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on line 80 (e.g., path), through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16, the deep slot cells 100, and the data storage drives 15. The commands are typically logical commands identifying the data storage cartridges or data storage cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10, depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessors 18, 28 and/or gripper assemblies 20, 30. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 3, the communication processor node 50 may additionally provide a line 70 for communicating with the data storage drives 15, e.g., a communication link. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Weich Selgarten 26, D¬91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and may communicate with the drives 15 and with host systems 40, 41, 42. Alternatively, the host systems 40, 41, 42 may be directly coupled to the communication processor node 50, at line 80 (e.g., input) for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, lines 80 and 81 are intended to be Ethernet and a SCSI bus, respectively, e.g., and may serve as host connections. However, path 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus, the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, storage cells 100, data storage drives 15, networks 60, etc.

Moreover, as described above, the automated data storage library 10 may comprise a plurality of accessors. For example, in addition to first accessors 18 in service bay frame 13, a second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover, the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
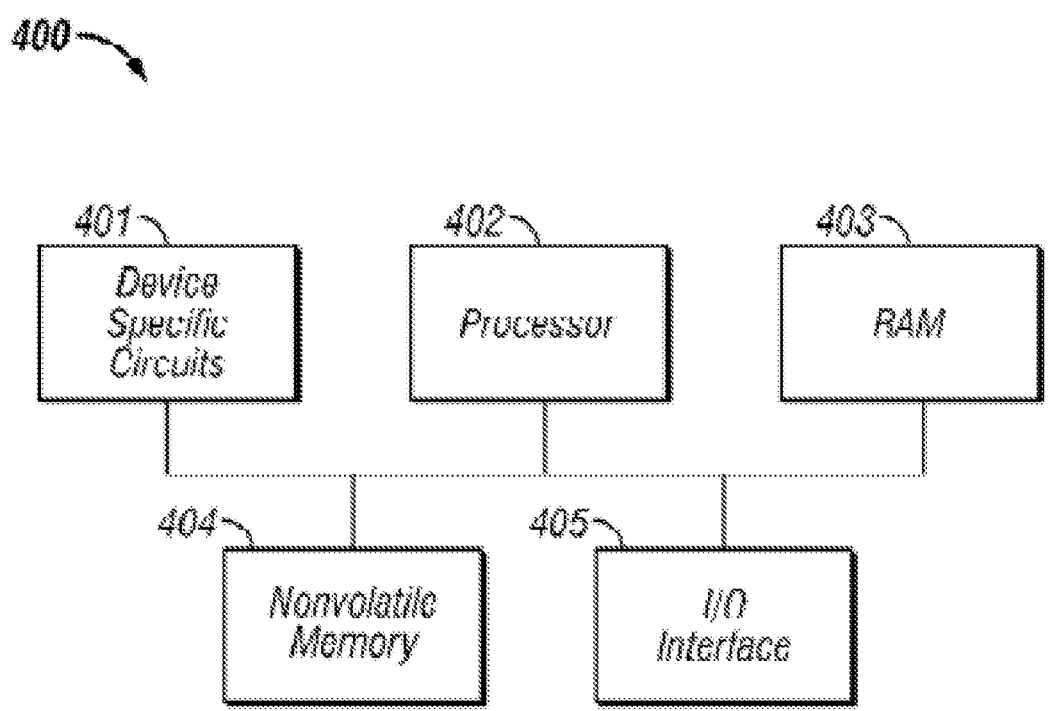
FIG. 4 is a block diagram depicting one embodiment of a controller configuration.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, Ethernet, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of an accessor cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
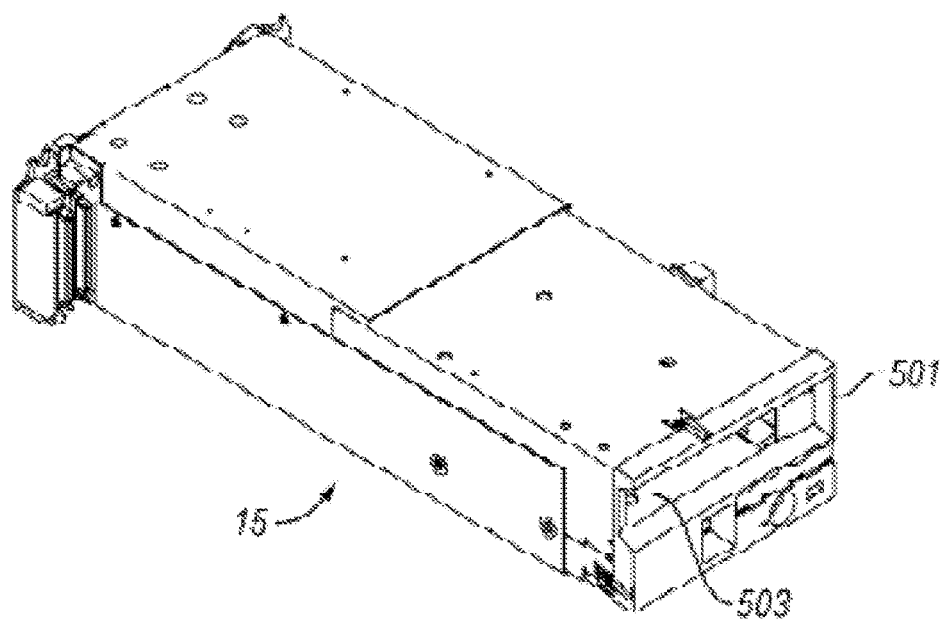
FIG. 5A is a front perspective view of one embodiment of a data storage drive.
Figure 5B:
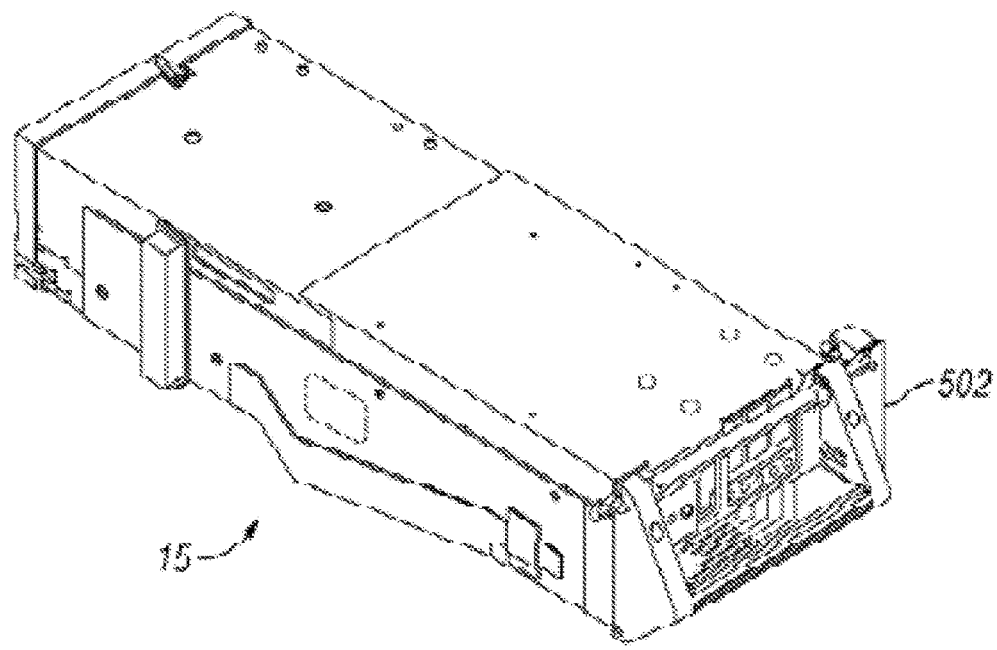
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the disclosure or the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge having data storage media may be placed into the data storage drive 15 at opening 503.

Figure 6:
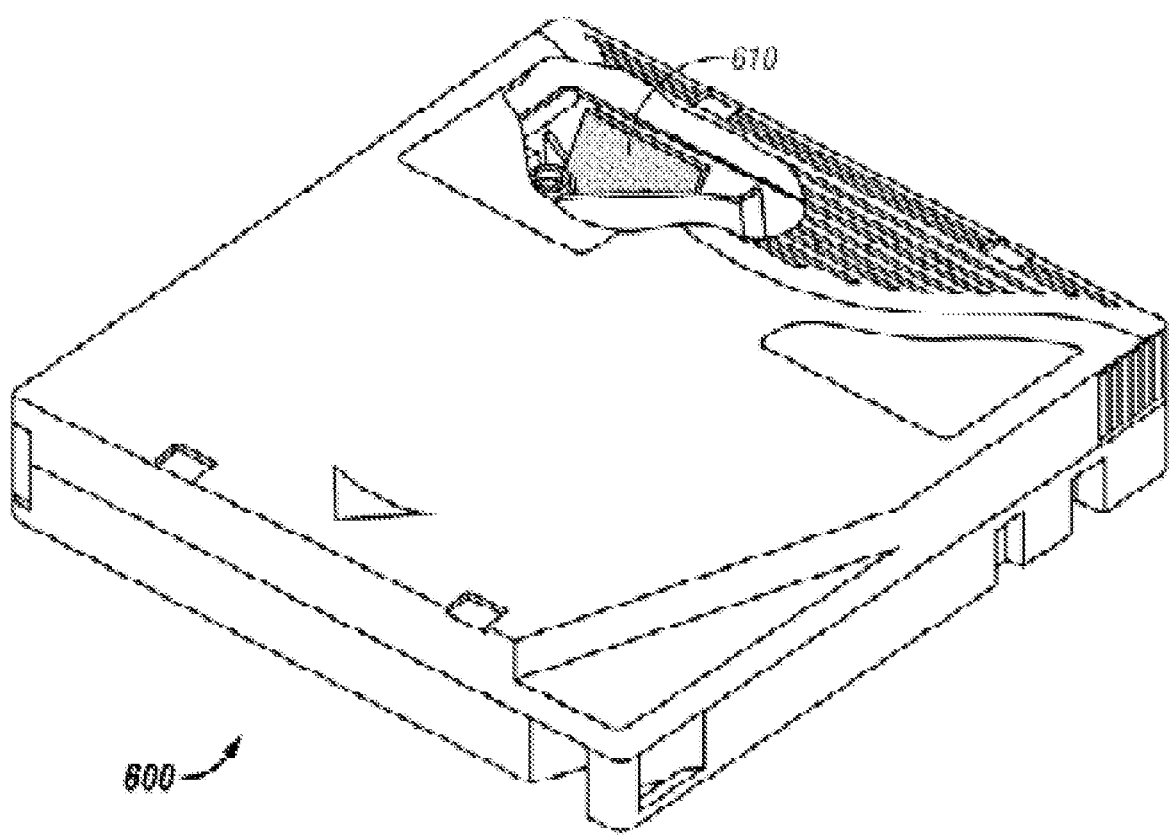
FIG. 6 is perspective view of one embodiment of a data storage cartridge having a cutaway portion.

Furthermore, FIG. 6 illustrates an embodiment of a data storage cartridge 600 with a cartridge memory 610 shown in a cutaway portion of FIG. 6, which is in no way intended to limit the disclosure or the invention. In fact, any configuration of data storage cartridge may be used whether or not it comprises a cartridge memory. According to various approaches, the media of the data storage cartridge may include any type of media on which data may be stored, including but not limited to magnetic media, e.g., magnetic tape, disks, etc.; optical media, e.g., optical tape, disks, etc.; electronic media, e.g., PROM, EEPROM, flash PROM, COMPACTFLASH™, SMARTMEDIA™, MEMORY STICK™, etc.; etc., or other suitable media. Moreover, an example of a data storage cartridge that is widely employed in automated data storage libraries for mass data storage is a magnetic tape cartridge in which the media is magnetic tape.

Figure 7A:
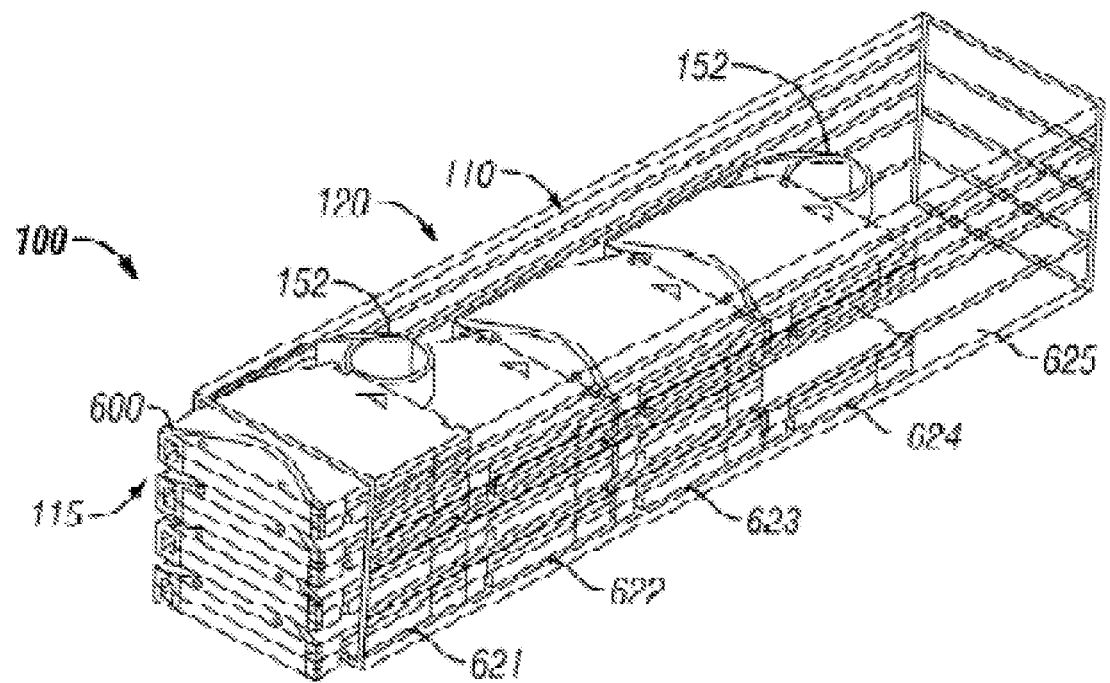
FIGS. 7A-7B are perspective views of one embodiment of a multi-cartridge deep slot cell, where
Figure 7B:
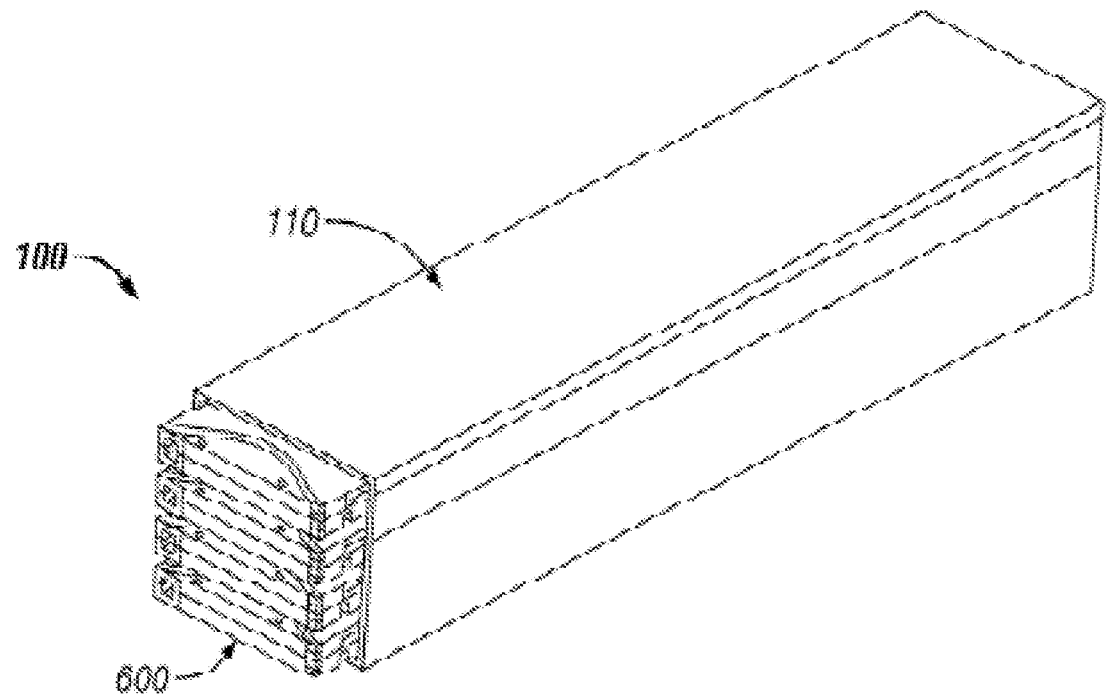

Referring now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. A plurality of storage slots 120 is disposed within the housing 110, and may be configured for storing a plurality of data storage cartridges 600, depending on the desired approach. Alternatively, the multi-cartridge deep slot cell 100 may be built into the frame of the automated data storage library according to one approach.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening 503 (See FIG. 5A) of the multi-cartridge deep slot cell 100, whereby the retaining gate 660 can be activated by an accessor 18, e.g., of an automated data storage library. Moreover, the retaining gate 660 allows for positive cartridge retention against the pressure of biasing springs (see 152 of FIG. 7A), and ensures that one or more data storage cartridges do not get pushed out of the multi-cartridge deep slot cell 100 simultaneously, while allowing the biasing springs (shown in FIG. 7A) of the multi-cartridge deep slot cell 100 to continuously push data storage cartridge(s) to the opening in a multi-cartridge deep slot cell 100. Thus, according to one approach, the accessor 18 may open the retaining gate 660 to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

Figure 8A:
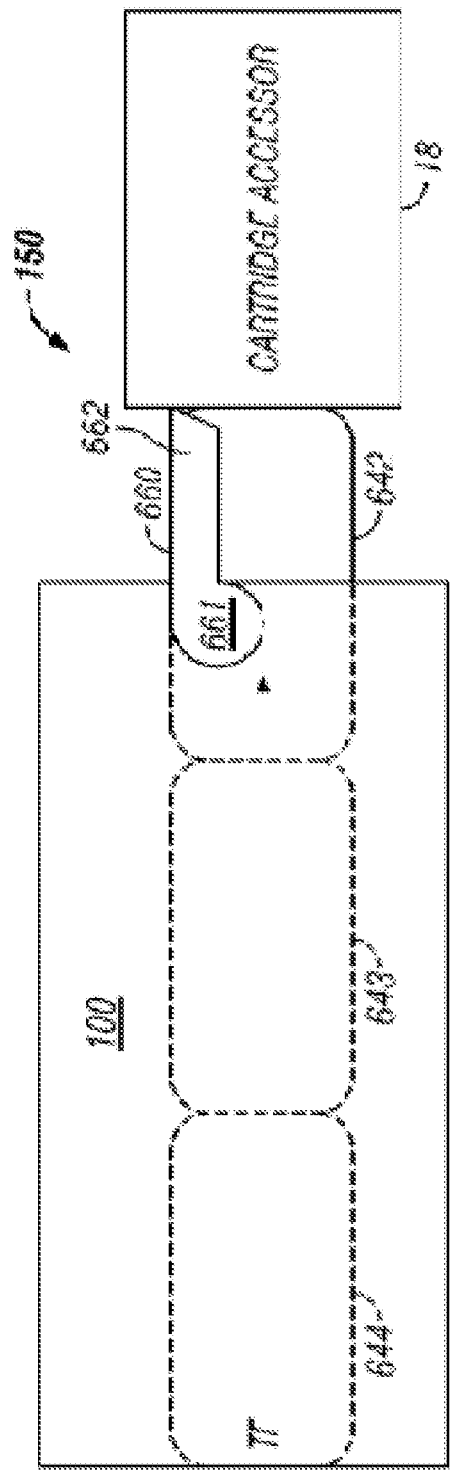
FIGS. 8A-8D are partial side views of one embodiment of a cartridge blocking mechanism.

The basic working of the retaining gate is that the gate prevents the data storage cartridge(s) from being pushed out of a multi-cartridge deep slot cell 100. For example, as shown in FIGS. 8A-8D, a retaining gate 660 may be lifted (See FIG. 8B) by, for example, accessor 18 or by a front storage cartridge 642 for cartridge removal/insertion into a multi-cartridge deep slot cell 100. Specifically, retaining gate 660 has a pivoting arm 661 mounted on multi-cartridge deep slot cell 100 via a pivoting post (not shown) that may be integral to or connected to a multi-cartridge deep slot cell 100. Retaining gate 660 includes a catch 662 whereby a thrust force TF through data storage cartridges 644-642 caused by the pushing mechanism biasing springs 152 (shown in FIG. 7A but not shown in FIG. 8A) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

Figure 8B:
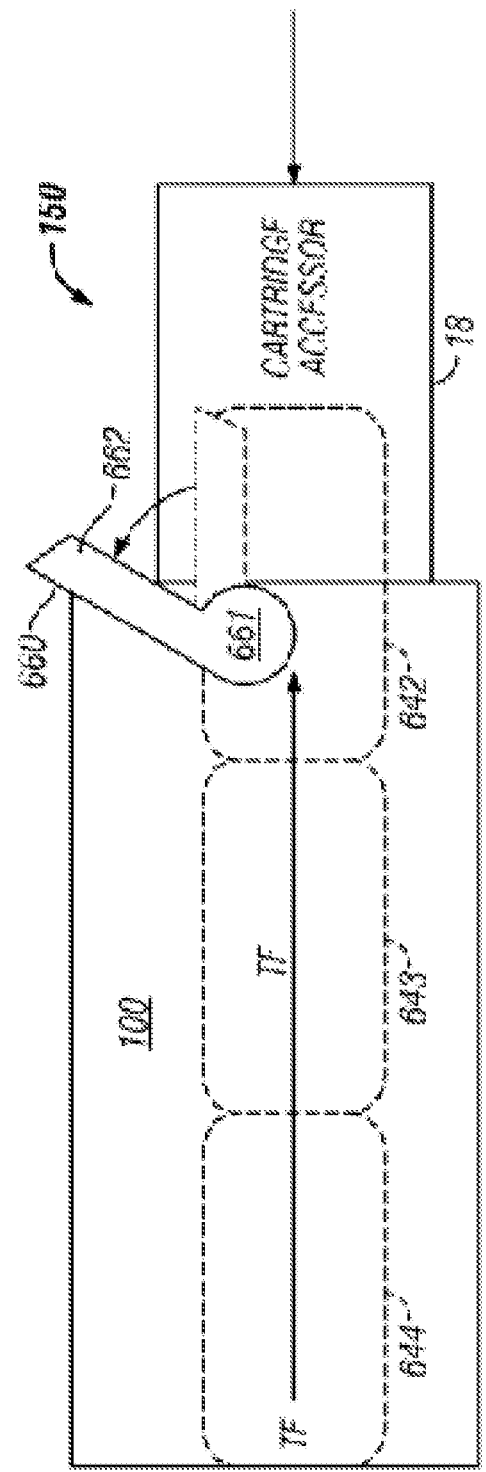
Figure 8C:
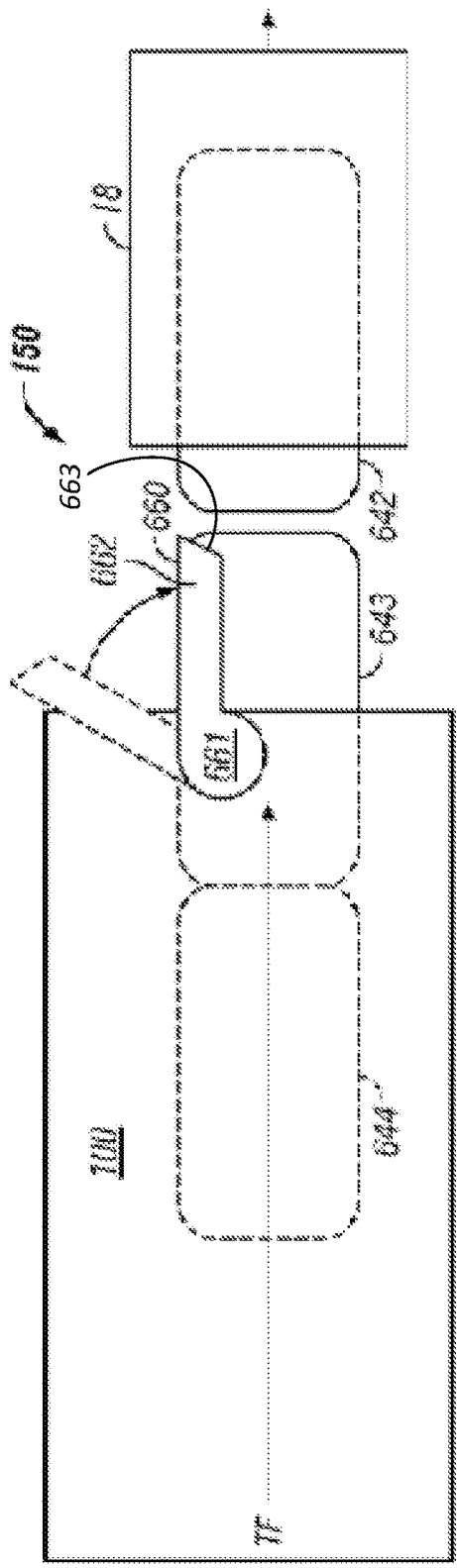

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown in FIG. 8C). During extraction of front storage cartridge 642 through the front opening of multi-cartridge deep slot cell 100, the retaining gate 660, which is biased downward, moves back to the retaining position to engage storage cartridge 643.

Figure 8D:
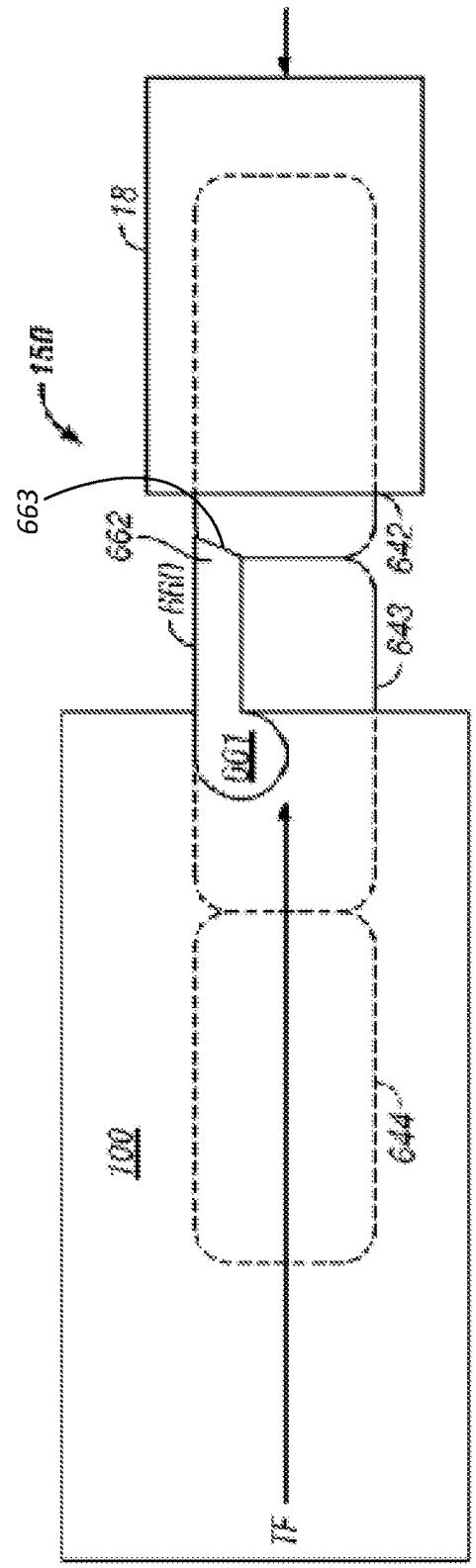

Once front storage cartridge 642 is extracted and storage cartridges 643 and 644 are retained from being pushed out of multi-cartridge deep slot cell 100, retaining gate 660 has successfully completed its cartridge retrieval process. In FIG. 8D, retaining gate 660 demonstrates its ability to insert the data storage cartridges into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface 663 of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion of the data storage cartridge into multi-cartridge deep slot cell 100, retaining gate 660 moves to its retaining position to engage storage cartridge 642 as shown in FIG. 8A.

Thus, looking to various embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

As disclosed above, in one embodiment, one or more data storage cartridges may be added into the library, e.g., at an I/O station 24, 25, whereby the controller of the automated data storage library 10 may then control and/or operate the accessor(s) 18, 28 to transport the cartridge(s) to specific multi-cartridge deep slot cell(s) 100, and place the cartridge (s) therein. Similarly, the controller may operate the accessor (s) to selectively extract, place and transport data storage cartridges with respect to the single cartridge storage slots 16, and/or transport inserted or added cartridge(s) to specific single cartridge storage slots 16.

A data storage library receives commands from a host application (e.g., software running on a host computer). Some of these commands may request cartridge movement. For example, a request to move a cartridge from a particular storage slot to a particular data storage drive. Location information contained within a data storage library command is commonly call an element address. There may be a range of element addresses that are used to identify storage slots (e.g., 1000-5000), another range of element addresses may identify data storage drives (e.g., 1-100), etc. In some data storage libraries, the element addresses may be directly related to specific physical locations within the data storage library (i.e., each address may refer to a specific physical location within the library). For example, element address 1 may refer to the top storage slot in the first column of storage slots, element address 2 may refer to the second storage slot in that column, etc. In some data storage libraries, some or all of the location information may be virtualized (i.e., there is no direct relationship between an element address and a particular physical storage slot). For example, there may be a lookup table that the library uses to convert an element address to a physical address within the library. One benefit of virtualization is that, in response to a host command, a cartridge does not have to be moved to a specific physical location. It can be moved to any convenient location and then the virtualization table updated with the new physical location that refers to a particular element address. Another way to visualize this is that cartridge movements from one storage slot to another storage slot would not require any physical movement of the cartridge at all. Instead, it would just involve an update to the virtualization translation table.

Figure 9:
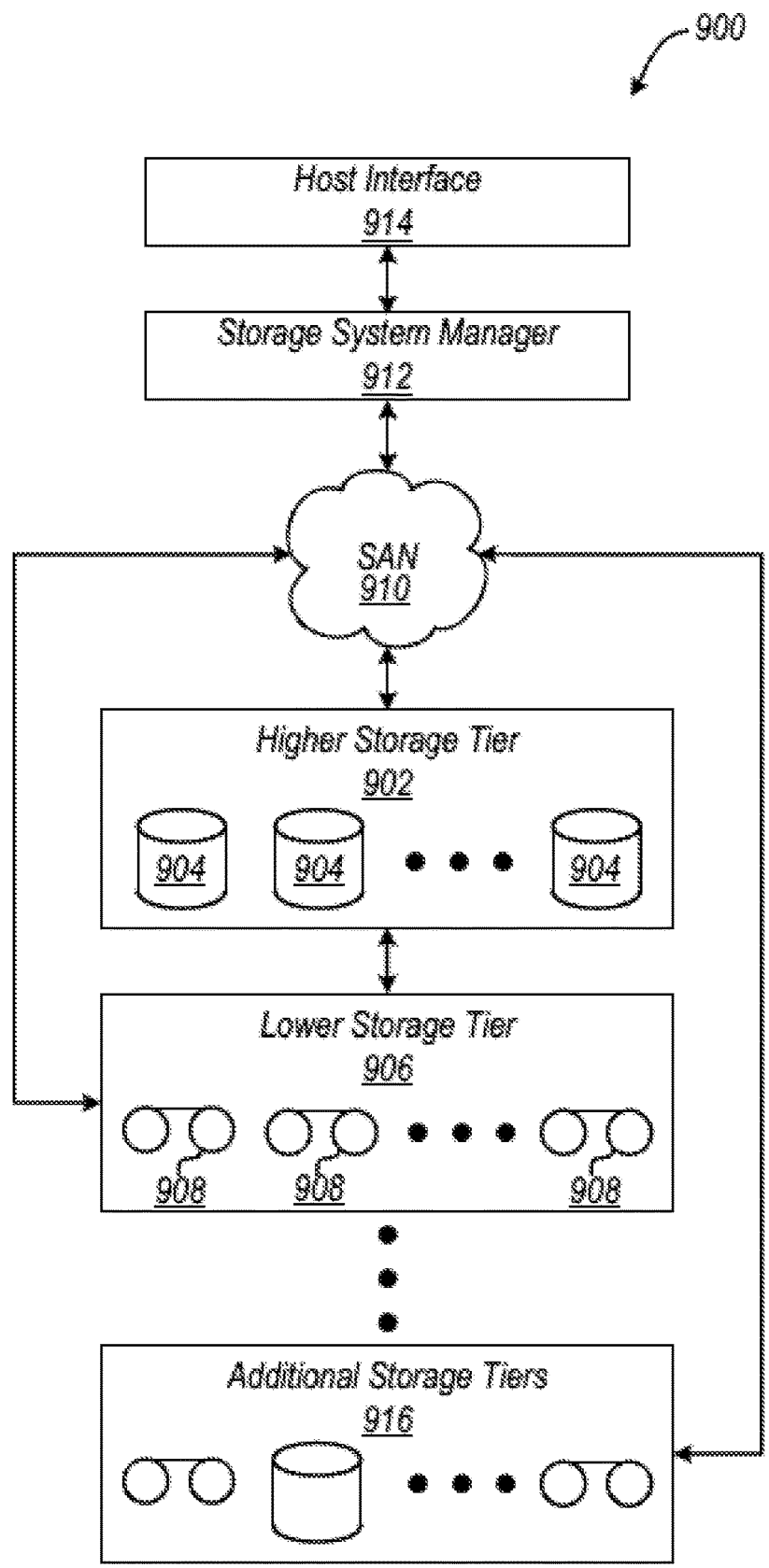
FIG. 9 is a block diagram of a tiered data storage system, in accordance with one embodiment.

Now referring to FIG. 9, a storage system 900 is shown according to one embodiment. Note that some of the elements shown in FIG. 9 may be implemented as hardware and/or software, according to various embodiments. In some approaches, the storage system 900 may be implemented in an automated data storage library such as that shown in FIGS. 1-2. In other approaches, an automated data storage library such as that shown in FIGS. 1-2 may be a tier of the storage system 900.

The storage system 900 may include a storage system manager 912 for communicating with a plurality of media on at least one higher storage tier 902 and at least one lower storage tier 906. The higher storage tier(s) 902 preferably may include one or more random access and/or direct access media 904, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 906 may preferably include one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Also, any of the higher storage tiers 902 and/or the lower storage tiers 906 may include some combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In one or more embodiments, the storage system 900 may include any number of data storage tiers, and may include the same or different data storage media within each storage tier. For example, each data storage tier may include the same type of data storage media, such as HDDs, SSDs, sequential access media (tape in tape drives, optical disk in optical disk drives, etc.), direct access media (CD-ROM, DVD-ROM, etc.), or any combination of data storage media types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions. Of course, this logic may be implemented as a method on any device and/or system or as a computer program product, according to various embodiments.

As disclosed above with respect to FIG. 2, one or more accessors 18 may be controlled to transport data storage cartridges containing data storage media between the plurality of storage slots 16, the multi-cartridge deep slot cells 100, and/or the data storage drive(s) 15. In conventional configurations, when a command is received to move a selected data storage cartridge from a storage slot 16 or one of the multi-cartridge deep slot cells 100 to a particular data storage drive 15, the accessor 18 is automatically maneuvered such that the gripper assembly 20 may retrieve the data storage cartridge from a storage slot 16 (or multi-cartridge deep slot cell 100), with the data storage cartridge then being inserted into the data storage drive 15. In situations where the selected data storage drive 15 already contains a different data storage cartridge, that data storage cartridge must first be removed from the data storage drive 15 by the gripper assembly 20 and maneuvered to an appropriate storage slot 16 (or multi-cartridge deep slot cell 100) prior to the insertion of the selected data storage cartridge into the data storage drive 15. Each storage slot 16 and/or multi-cartridge deep slot cell 100 may be mapped such that the data storage cartridge(s) contained therein are appropriately identifiable and the precise location of each data storage cartridge is stored in a memory such as, e.g., RAM 403 for future retrieval.

While the accessor 18 is capable of automatically moving data storage cartridges between storage slots 16, multi-cartridge deep slot cells 100, and/or the data storage drive(s) 15, the amount of time (and the electrical energy consumed) to make such movements inherently increases the greater the distance between the storage slots 16, multi-cartridge deep slot cells 100, and/or the data storage drive(s) 15. As shown in FIG. 2, the storage slots 16 may be located on an opposite wall of the data storage library 10 as that of the data storage drive(s) 15. Thus, in many instances, the accessor must first move to retrieve a first data storage cartridge from a data storage drive 15, return the first data storage cartridge to a designated storage slot 16, retrieve a second data storage cartridge from a different storage slot 16, and return to the data storage drive 15 to insert the second data storage cartridge. Such frequent movements of accessor 18 may account for increased idle time in the read/write operation of the data storage drive 15, increased electrical energy usage, and/or increased wear on the components of the accessor 18. Thus, as set forth in further detail below, and in accordance with an aspect of the present disclosure, a method of combining data storage cartridge move commands so as to reduce movements of the accessor 18 is proposed.

Figure 10:
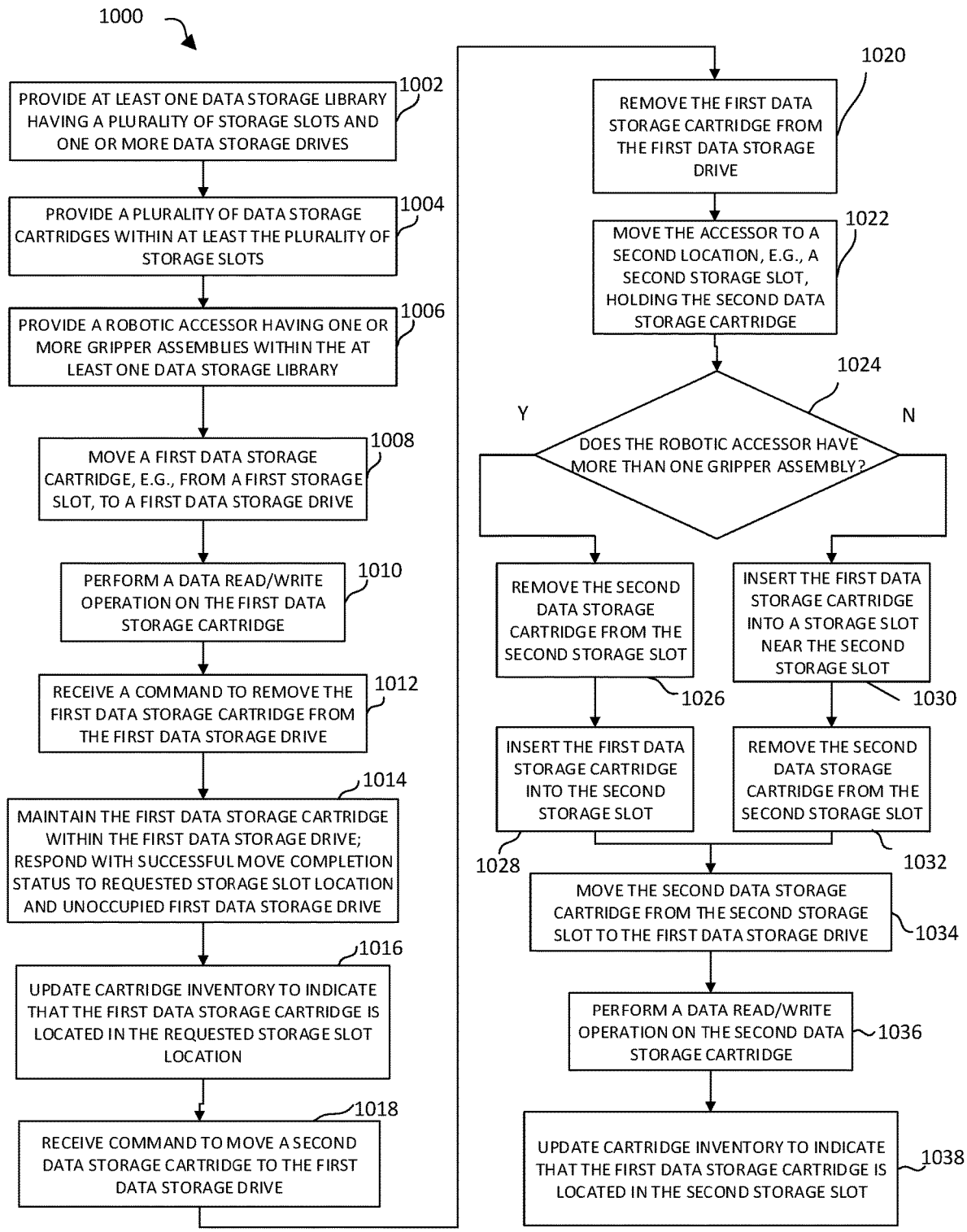
FIG. 10 is flowchart of a method of controlling movement of a plurality of data storage cartridges within an automated data storage library in accordance with an aspect of the disclosure.

Referring to FIG. 10, a method 1000 of combining data storage cartridge move commands in accordance with an aspect of the disclosure is shown. At 1002, at least one data storage library having a plurality of storage slots and one or more data storage drives is provided. The at least one data storage library may be configured similarly to automated data storage library 10 described above with respect to FIGS. 1-2, but is not limited as such. At 1004, a plurality of data storage cartridges are provided within at least the plurality of storage slots. The data storage cartridges may be configured similarly to data storage cartridges 600 described above with respect to FIG. 6, but are not limited as such. Additionally, the data storage cartridges may be stored or inserted into locations other than storage slots within the at least one data storage library, such as, e.g., one or more multi-cartridge deep slot cells, one or more data storage drives, etc. Next, at 1006, a robotic accessor having one or more gripper assemblies is provided within the at least one data storage library. As detailed above with respect to FIG. 2, the robotic accessor is configured to automatically retrieve and relocate data storage cartridges within the data storage library between storage slots, multi-cartridge deep slot cell, data storage drives, etc. Movement of the data storage cartridges via the robotic accessor is dictated by various commands received from one or more host systems, as detailed above with respect to FIG. 3.

Next, at 1008, a command is received from the one or more host systems to move a first data storage cartridge from a first storage slot to a first data storage drive. Alternatively, the first data storage cartridge may be moved to the first data storage drive from a different location, such as, e.g., a multi-cartridge deep slot cell, a different data storage drive, etc. At 1010, a data read and/or write operation is performed by the first data storage drive.

After the data read and/or write operation is completed by the first data storage drive, at 1012, a command is received from the one or more host systems to remove the first data storage cartridge from the first data storage drive. Conventionally, the robotic accessor would be controlled to retrieve the first data storage cartridge based on such a command, moving the first data storage cartridge from the first data storage drive to an appropriate storage location. However, in accordance with the present disclosure, at 1014, the first data storage cartridge is maintained within the first data storage drive, despite the received command to move the first data storage cartridge. Additionally, although the first data storage cartridge is held within the first data storage drive, the system is configured to respond to the host with a successful move completion status of the first data storage cartridge to the requested storage slot location. As such, the first data storage cartridge is "virtually" moved to the requested storage slot location while remaining in place within the first data storage drive. Furthermore, if queried as to the status of the first data storage drive, the system is configured to respond to the host that the first data storage drive is unoccupied, despite the continued presence of the first data storage cartridge. For example, the SCSI command set includes a Test Unit Ready (TUR) command that is often used to request the status of a data storage drive. Among other things, the response to the TUR command may include status as to whether the data storage drive is occupied or unoccupied with respect to the presence of a data storage cartridge in the drive.

At 1016, the cartridge inventory may be updated to indicate that the first data storage cartridge is located within the requested storage slot location. For example, the inventory that is reported to a host that issues a SCSI Read Element Status (RES) command. In this way, the location of the first data storage cartridge is "virtually" within the requested storage slot location, but the robotic accessor was not operated so as to relocate the first data storage cartridge, thereby reducing the time and energy consumed to make such moves within the data storage library.

Next, at 1018, a separate command is received from the host to move a second data storage cartridge to the first data storage drive. As detailed above, the first data storage drive still contains the first data storage cartridge, although an "unoccupied" status of the first data storage drive has been provided. Accordingly, the first data storage cartridge must first be removed from the first data storage drive prior to insertion of the second data storage cartridge. Thus, at 1020, the robotic accessor is controlled to remove the first data storage cartridge from the first data storage drive. Then, at 1022, the robotic accessor is controlled to move through the data storage library to a second location, e.g., a second storage slot, holding the second data storage cartridge. Alternatively, the second data storage cartridge may be stored in a different location, such as, e.g., a multi-cartridge deep slot cell, a different data storage drive, etc. Ideally, the second location is in proximity to the location of the second data storage cartridge. Herein, proximity refers to a distance that is less than or equal to the distance that would be required to place the first data storage cartridge in its original location.

Next, at 1024, a determination is made as to whether or not the robotic accessor has more than one gripper assembly, as a robotic accessor with more than one gripper assembly may hold and move more than one data storage cartridge at a time. If yes, at 1026, the second data storage cartridge is removed from the second storage slot, and the first data storage cartridge is then inserted into its place within the second storage slot (at 1028). However, if no, at 1030, the first data storage cartridge is inserted into a storage slot located near the second storage slot. Then, at 1032, the second data storage cartridge may be removed from the second storage slot.

At 1034, the robotic accessor is controlled to move the second data storage cartridge from the second storage slot to the first data storage drive. At 1036, a data read and/or write operation is performed by the first data storage drive on the second data storage cartridge, and at 1038, the cartridge inventory is updated so as to indicate that the first data storage cartridge is located in the second storage slot (in the case that the robotic accessor includes more than one gripper assembly). It is to be understood that in instances where the robotic accessor includes only one gripper assembly, the cartridge inventory may be updated to indicate that the first data storage cartridge is in a selected storage slot near the second storage slot. Additionally, it is to be understood that the method 1000 set forth herein may be repeated for any and all data storage cartridges and/or data storage drives within the data storage library.

With the method 1000 described above, unnecessary travel by the robotic accessor may be avoided in order to reduce time and energy consumed when moving data storage cartridges between storage slots and data storage drives. Required movement of the robotic accessor may be reduced by up to 50% using the method 1000, as the data storage cartridges need not be removed and transported from the data storage drives to a separate storage slot upon completion of a read/write operation. Also, unlike previous attempts to provide performance improvements to the data storage library, the method 1000 does not require the use of dedicated or even temporary (or repository) storage slots adjacent the data storage drives for the temporary placement of data storage cartridges when changing data storage cartridges.

Furthermore, while method 1000 describes removing the first data storage cartridge from the first data storage drive (step 1020) prior to removing the second data storage cartridge from the second storage slot (step 1026 or 1032), it is to be understood that these operations may be reversed. That is, the robotic accessor may be controlled to remove the second data storage cartridge from the second storage slot first, swap the second data storage cartridge with the first data storage cartridge, and then move the first data storage cartridge to the second storage slot (or another location). In either scenario, the total required movement of the robotic accessor is reduced as compared to conventional data storage library operations.

In some situations, a command may be received to move the first data storage cartridge to a second data storage drive before the first data storage cartridge has been removed from the first data storage drive. In this case, the robotic accessor is controlled to directly move the first data storage cartridge between the respective data storage drives. While such a scenario would not eliminate an entire accessor travel operation between the storage slots and the data storage drives as is done in method 1000 described above, there is still a performance advantage over conventional data storage library operations, as the data storage drives are typically clustered within the data storage library. That is, the total distance that the robotic accessor must travel to move the first data storage cartridge from the first data storage drive to the second data storage drive is still less than the distance between the storage slots and the data storage drives, thereby improving the performance of the data storage library.

Furthermore, as noted above with respect to FIG. 9, the data storage cartridges may be stored within various storage tiers. In the event that a data storage cartridge (e.g., the second data storage cartridge) is stored within a deep slot of a lower storage tier, it may not be possible to directly swap the second data storage cartridge and the first data storage cartridge, particularly if the robotic accessor has only one gripper assembly. However, in such a scenario, in accordance with another aspect of the disclosure, the first data storage cartridge may be moved to a slot nearby that of the second data storage cartridge, thus allowing for at least a partial performance advantage over conventional data storage library operations. In addition, the data storage library may be configured to store more commonly-used data storage cartridges in higher storage tiers, thereby making those data storage cartridges more accessible for the application of the method 1000 described above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, an SD (Secure Digital) Card, a Micro SD Card, a CompactFlash Card, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, such as a library controller, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Some blocks may be combined and some may be removed. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as controller 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of combining move commands of an automated data storage library, the method comprising:

receiving a first command from a host system to remove a first data storage cartridge from a data storage drive of the automated data storage library;

maintaining the first data storage cartridge within the data storage drive;

responding to the host system with a successful move completion status of the first data storage cartridge from the data storage drive, even though the first data storage cartridge is maintained within the data storage drive;

receiving a second command from the host system to move a second data storage cartridge to the data storage drive;

removing the first data storage cartridge from the data storage drive;

transporting the first data storage cartridge to a proximity of a storage slot of the automated data storage library holding the second data storage cartridge;

removing the second data storage cartridge from the storage slot;

inserting the first data storage cartridge into the storage slot previously holding the second data storage cartridge or a separate storage slot located near the storage slot previously holding the second data storage cartridge;

transporting the second data storage cartridge to the data storage drive; and inserting the second data storage cartridge into the data storage drive.

2. The method of claim 1, further comprising responding to the host system with an unoccupied data storage drive status after receiving a status request command from the host system, even though the first data storage cartridge is maintained within the data storage drive.

3. The method of claim 1, further comprising updating a cartridge inventory for the host system to indicate that the first data storage cartridge is located in a requested storage slot location after receiving the first command from the host system to remove the first data storage cartridge from the data storage drive, even though the first data storage cartridge is maintained within the data storage drive.

4. The method of claim 1, wherein the steps of transporting the first data storage cartridge and the second data storage cartridge are completed by a robotic accessor of the automated data storage library.

5. The method of claim 4, wherein if the robotic accessor has only one gripper assembly, the first data storage cartridge is inserted into the separate storage slot located near the storage slot previously holding the second data storage cartridge prior to removal of the second data storage cartridge from the storage slot.

6. The method of claim 4, wherein if the robotic accessor has more than one gripper assembly, the first data storage cartridge is inserted into the storage slot previously holding the second data storage cartridge after removal of the second data storage cartridge from the storage slot.

7. The method of claim 1, further comprising performing, by the data storage drive, at least one of a data read operation and a data write operation on the first data storage cartridge prior to receiving the first command from the host system to remove the first data storage cartridge from the data storage drive.

8. The method of claim 1, further comprising performing, by the data storage drive, at least one of a data read operation and a data write operation on the second data storage cartridge after inserting the second data storage cartridge into the data storage drive.

9. The method of claim 1, further comprising updating a cartridge inventory of the host system to indicate that the first data storage cartridge is located in one of the storage slot previously holding the second data storage cartridge or the separate storage slot located near the storage slot previously holding the second data storage cartridge after inserting the second data storage cartridge into the data storage drive.

10. A method comprising:
providing at least one data storage library having a plurality of storage slots and one or more data storage drives;
providing a plurality of data storage cartridges within at least the plurality of storage slots;
providing a robotic accessor having one or more gripper assemblies within the at least one data storage library;
transporting, by the robotic accessor, a first data storage cartridge from a first storage slot to one of the one or more data storage drives;
receiving a first command from a host system to remove the first data storage cartridge from the data storage drive;
maintaining the first data storage cartridge within the data storage drive;
responding to the host system with a successful move completion status of the first data storage cartridge from the data storage drive, even though the first data storage cartridge is maintained within the data storage drive;
receiving a second command from the host system to move a second data storage cartridge to the data storage drive;
removing, by the robotic accessor, the first data storage cartridge from the data storage drive;
transporting, by the robotic accessor, the first data storage cartridge to a proximity of a second storage slot of the at least one data storage library holding the second data storage cartridge;
removing, by the robotic accessor, the second data storage cartridge from the second storage slot;
inserting, by the robotic accessor, the first data storage cartridge into the second storage slot or a separate storage slot located near the second storage slot;
transporting, by the robotic accessor, the second data storage cartridge to the data storage drive; and
inserting, by the robotic accessor, the second data storage cartridge into the data storage drive.

11. The method of claim 10, further comprising responding to the host system with an unoccupied data storage drive status after receiving a status request command from the host system, even though the first data storage cartridge is maintained within the data storage drive.

12. The method of claim 10, further comprising updating a cartridge inventory for the host system to indicate that the first data storage cartridge is located in a requested storage slot location after receiving the first command from the host system to remove the first data storage cartridge from the data storage drive, even though the first data storage cartridge is maintained within the data storage drive.

13. The method of claim 10, wherein if the robotic accessor has only one gripper assembly, the first data storage cartridge is inserted into the separate storage slot located near the second storage slot prior to removal of the second data storage cartridge from the second storage slot.

14. The method of claim 10, wherein if the robotic accessor has more than one gripper assembly, then the first data storage cartridge is inserted into the second storage slot after removal of the second data storage cartridge from the second storage slot.

15. A method of combining move commands of an automated data storage library, the method comprising:
receiving a first command from a host system to remove a first data storage cartridge from a data storage drive of the automated data storage library;
maintaining the first data storage cartridge within the data storage drive until receiving a second command from the host system to move a second data storage cartridge into the data storage drive;
responding to the host system with a successful move completion status of the first data storage cartridge from the data storage drive, even though the first data storage cartridge is maintained within the data storage drive; and
updating a cartridge inventory for the host system to indicate that the first data storage cartridge is located in a requested storage slot location after receiving the first command from the host system to remove the first data storage cartridge from the data storage drive, even though the first data storage cartridge is maintained within the data storage drive.

16. The method of claim 15, further comprising responding to the host system with an unoccupied data storage drive status after receiving a status request command from the host system, even though the first data storage cartridge is maintained within the data storage drive.

17. The method of claim 15, wherein, upon receiving the second command from the host system, removing the first data storage cartridge from the data storage drive, and transporting the first data storage cartridge to a proximity of a storage slot of the automated data storage library holding the second data storage cartridge.

18. The method of claim 17, further comprising:
removing the second data storage cartridge from the storage slot;

inserting the first data storage cartridge into one of the storage slot previously holding the second data storage cartridge or a separate storage slot located near the storage slot previously holding the second data storage cartridge;

transporting the second data storage cartridge to the data storage drive; and inserting the second data storage cartridge into the data storage drive.

19. The method of claim 18, wherein the steps of transporting the first data storage cartridge and the second data storage cartridge are completed by a robotic accessor having only one gripper assembly, and further wherein the first data storage cartridge is inserted into the separate storage slot located near the storage slot previously holding the second data storage cartridge prior to removal of the second data storage cartridge from the storage slot.

20. The method of claim 18, wherein the steps of transporting the first data storage cartridge and the second data storage cartridge are completed by a robotic accessor having more than one gripper assembly, and further wherein the first data storage cartridge is inserted into the storage slot previously holding the second data storage cartridge after removal of the second data storage cartridge from the storage slot.

* * * * *